(12) United States Patent
Bowler et al.

(10) Patent No.: US 7,574,578 B2
(45) Date of Patent: Aug. 11, 2009

(54) SYSTEM AND METHOD OF ADAPTIVE MEMORY STRUCTURE FOR DATA PRE-FRAGMENTATION OR PRE-SEGMENTATION

(75) Inventors: Michael Bowler, Ottawa (CA); Neil Hamilton, Kanata (CA)

(73) Assignee: Elliptic Semiconductor Inc., Kanata, Ontario (CA)

( * ) Notice: Subject to any disclaimer, the term of this patent is extended or adjusted under 35 U.S.C. 154(b) by 158 days.

(21) Appl. No.: 11/118,422

(22) Filed: May 2, 2005

(65) Prior Publication Data

US 2006/0248102 A1 Nov. 2, 2006

(51) Int. Cl.
*G06F 5/10* (2006.01)
(52) U.S. Cl. .................... 711/171; 707/101
(58) Field of Classification Search .......... 711/170, 711/171; 707/101
See application file for complete search history.

(56) References Cited

U.S. PATENT DOCUMENTS

| | | | |
|---|---|---|---|
| 6,434,620 B1 * | 8/2002 | Boucher et al. ......... 709/230 |
| 6,487,212 B1 * | 11/2002 | Erimli et al. ............. 370/413 |
| 6,937,606 B2 * | 8/2005 | Basso et al. ............. 370/412 |
| 6,963,572 B1 * | 11/2005 | Carr et al. ............... 370/401 |
| 6,977,894 B1 * | 12/2005 | Achilles et al. .......... 370/235 |
| 7,152,069 B1 * | 12/2006 | Santry et al. ............ 707/100 |
| 2001/0048681 A1 * | 12/2001 | Bilic et al. .............. 370/389 |
| 2003/0182529 A1 * | 9/2003 | Fairweather ........... 711/170 |
| 2004/0073683 A1 * | 4/2004 | Beck et al. .............. 709/227 |
| 2005/0097296 A1 * | 5/2005 | Chamberlain et al. ... 711/170 |
| 2005/0204058 A1 * | 9/2005 | Philbrick et al. ........ 709/238 |

* cited by examiner

*Primary Examiner*—Matt Kim
*Assistant Examiner*—Hal Schnee
(74) *Attorney, Agent, or Firm*—Freedman & Associates (57) ABSTRACT

A method and apparatus are disclosed for prefragmenting or presegmenting data. A data protocol type and length are provided. Based on the type and length, a linked list memory buffer structure is determined. Locations within the memory buffer structure for storage of data therein is also determined allowing for sufficient unused memory therein to support one of a fragmentation operation and a segmentation operation subsequent to memory allocation. As such, further memory allocation during a fragmentation operation or a segmentation operation is obviated. The determined memory buffer structure is then allocated.

24 Claims, 8 Drawing Sheets

SYSTEM AND METHOD OF ADAPTIVE MEMORY STRUCTURE FOR DATA PRE-FRAGMENTATION OR PRE-SEGMENTATION

FIELD OF THE INVENTION

The invention relates to the field of networking protocol stack processors and more specifically to the field of managing of data packets in an efficient manner.

BACKGROUND OF THE INVENTION

Memory buffers (MBUFs) are well known in the software and hardware design of protocol stack processors. MBUFs according to the Berkeley Software Distribution (BSD) implementation include a control portion and a data portion. The MBUF allocated memory is of a fixed size relating to the memory available and communication data being processed. A typical choice for MBUF size is between 128 and 512 bytes.

BSD was designed with systems having significant power and memory resources in mind. In today's technology markets, wireless battery operated circuits are becoming ever more popular. With their popularity, increased resource efficiency becomes a critical limitation on performance.

It would be advantageous to provide a memory allocation process for more efficient resource utilization that is backward compatible with current protocol implementations.

SUMMARY OF THE INVENTION

In accordance with the invention there is provided a method comprising: providing a data protocol type and length; determining in dependence upon the data protocol type and the length a linked list memory buffer structure and locations within the memory buffer structure for storage of data therein, the memory buffer structure having sufficient unused memory therein to support one of a fragmentation operation and a segmentation operation subsequent to a memory allocation operation and absent a further memory allocation during said one of a fragmentation operation and a segmentation operation; and, allocating memory within a memory storage space, the memory allocated in accordance with the determined linked list memory buffer structure.

In accordance with another aspect of the invention there is provided a circuit comprising: a buffer for receiving data; and, one of a pre-segmentation and pre-fragmentation circuit comprising memory allocation circuitry for determining in dependence upon the data protocol type and the length a linked list memory buffer structure and locations within the memory buffer structure for storage of data therein, the memory buffer structure having sufficient unused memory therein to support one of a fragmentation operation and a segmentation operation subsequent to a memory allocation operation and absent a further memory allocation during said one of a fragmentation operation and a segmentation operation, and allocating memory within a memory storage space, the memory allocated in accordance with the determined linked list memory buffer structure.

In accordance with yet another aspect of the invention there is provided a storage medium having data stored therein, the data for when executed resulting in a circuit design comprising: one of a pre-segmentation and pre-fragmentation circuit comprising memory allocation circuitry for determining in dependence upon the data protocol type and the length a linked list memory buffer structure and locations within the memory buffer structure for storage of data therein, the memory buffer structure having sufficient unused memory therein to support one of a fragmentation operation and a segmentation operation subsequent to a memory allocation operation and absent a further memory allocation during said one of a fragmentation operation and a segmentation operation, and locating memory within a memory storage space, the memory allocated in accordance with the determined linked list memory buffer structure.

BRIEF DESCRIPTION OF THE DRAWINGS

Exemplary embodiments of the invention will now be described in conjunction with the following drawings, in which.

DETAILED DESCRIPTION THE INVENTION

Figure 1A:
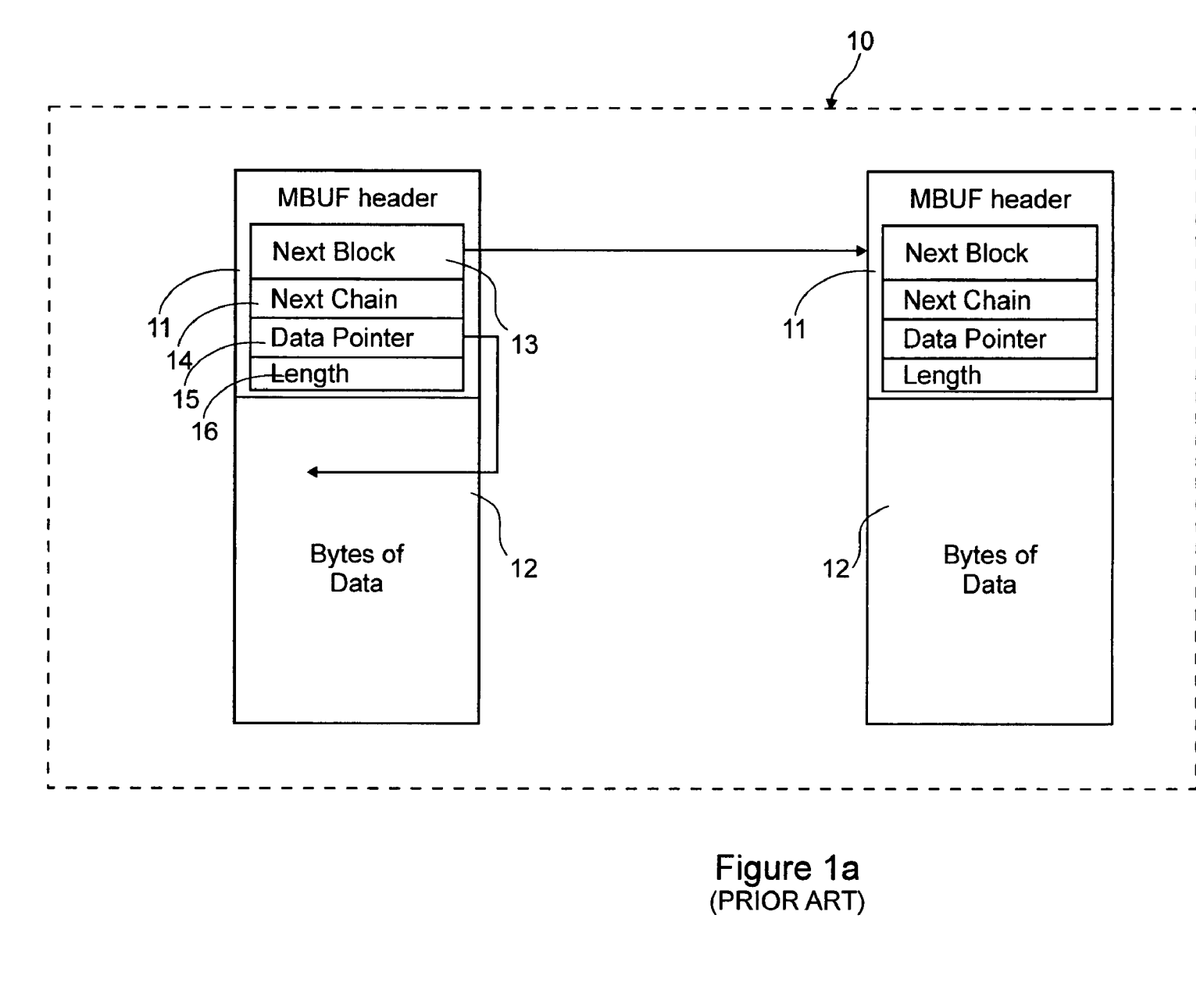
FIG. 1a illustrates a plurality of prior art memory buffers (MBUFs) in a linked list.

FIG. 1a illustrates a chain consisting of two MBUFs 10 according to the prior art. Each MBUF comprises control data 11 in the form of an MBUF header comprising a link address for a next block 13, a link address for a next chain 14, a data pointer 15, and a data length 16. Typically, the MBUF header occupies 32 bytes. Each MBUF further comprises a data portion 12 for storing of data therein. Typically, MBUFs are between 128 and 512 bytes with an MBUF of 256 bytes being most typical. As such, the use of MBUFs is relatively memory efficient for small packets.

Figure 1B:
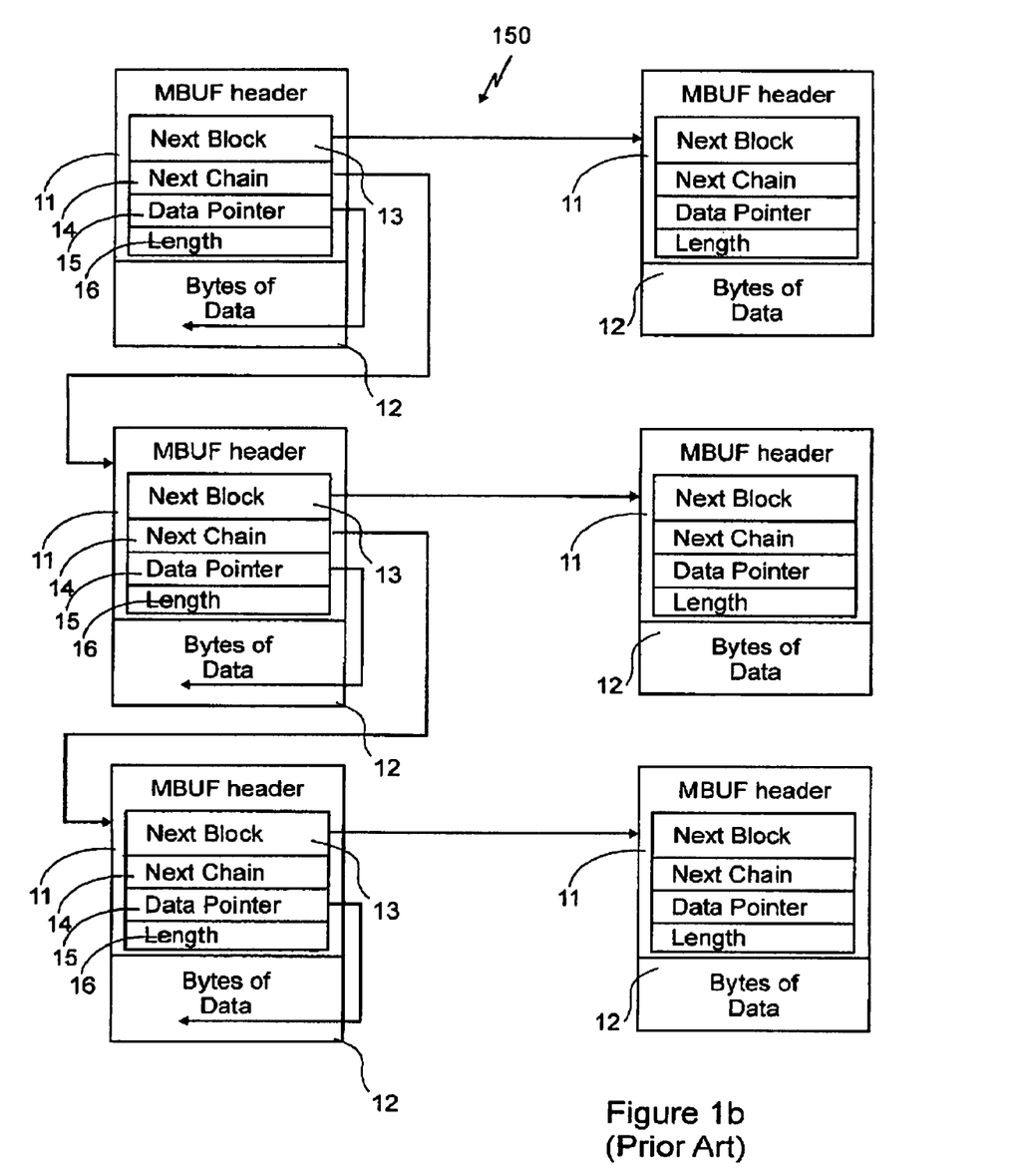
FIG. 1b illustrates a plurality of prior art memory buffers (MBUFs) in a two dimensional linked array.

FIG. 1b illustrates three chains each consisting of two MBUFs 150 according to the prior art. Each MBUF comprises control data 11 in the form of an MBUF header comprising a link address for a next block 13, a link address for a next chain 14, a data pointer 15, and a data length 16. Typically, the MBUF header occupies 32 bytes. Each MBUF further comprises a data portion 12 for storing of data therein. Typically, MBUFs are between 128 and 512 bytes with an MBUF of 256 bytes being most typical. As such, the use of MBUFs is relatively memory efficient for small packets. The chain shown is, for example, for use with the transport control protocol/Internet protocol (TCP/IP). Each MBUF disposed within a row in a first location thereof further comprises a second link address indicative of an address of an MBUF within a subsequent row or a null pointer in the last row.

Figure 2:
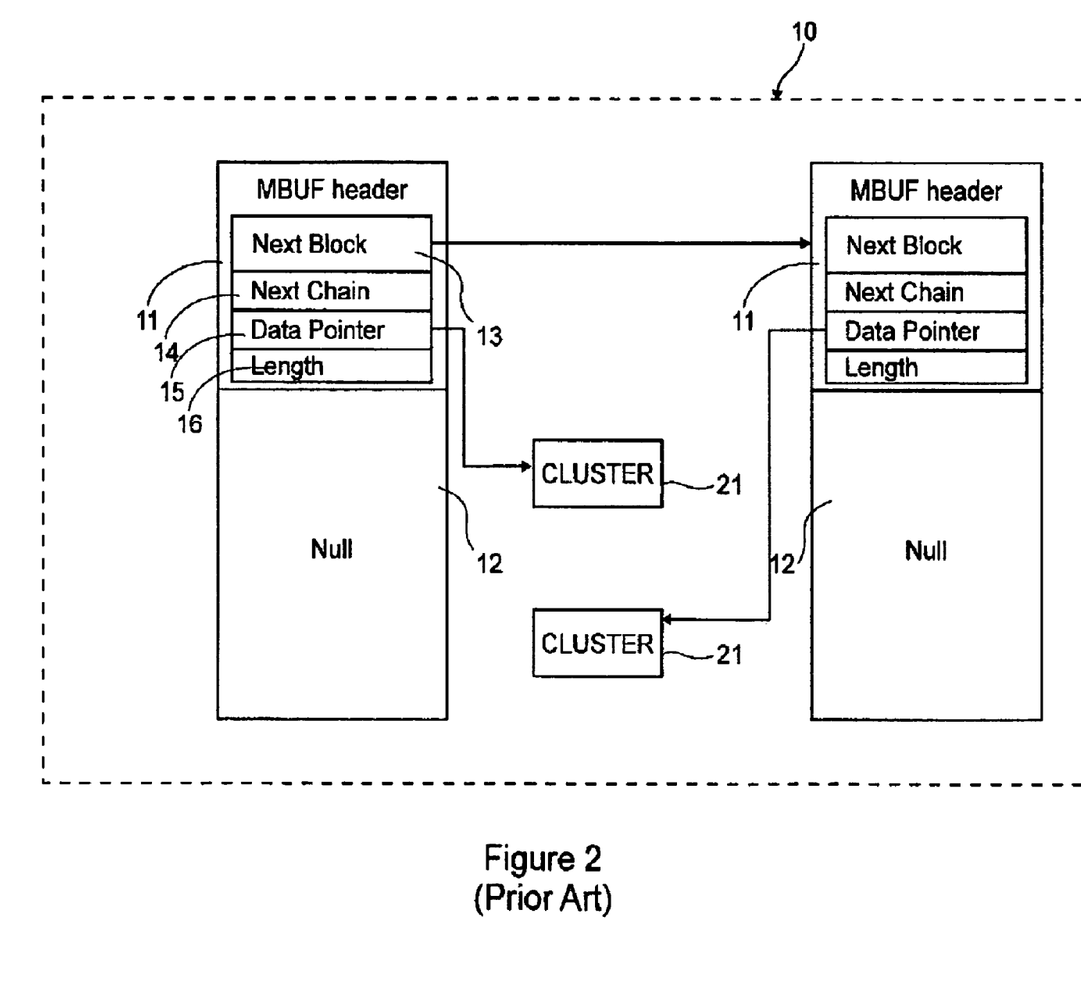
FIG. 2 illustrates a plurality of prior art MBUFs in a chain and addressing data within a cluster.

Referring to FIG. 2, for larger data packets, a cluster 21 is often used wherein the data portion 12 of the MBUF 10 is unused and the cluster 21—a separate data location within memory—is used for storing of the data. The control portion 11 of the MBUF 10 remains similarly utilized though the data pointer 15 points to an address within the cluster. In this fashion, the memory usage is not overly represented by the control data portion 11 of the MBUF 10 and the null MBUF data portion 12 is small compared to the amount of data stored within the cluster 21. Thus, memory usage efficiency remains regardless of packet data size.

When data is stored within prior art MBUF structures, fragmenting of the data or segmenting thereof typically requires a significant amount of further memory allocation for storing of data relating to the fragmenting or segmenting operation. Further, moving of the data is then required for completing the fragmentation or segmentation operation. The further memory allocation and moving of the data results in increased power consumption of added complexity for supporting fragmentation and segmentation. One way to avoid this is to not process segments and fragments, however, such an approach will not be compatible with existing implementations and standards. Thus, in cases where MBUF reorganization is necessary, a more efficient process would be advantageous.

For example, to segment data stored within the structure of FIG. 1b, an MBUF is allocated and pre-appended to the linked list in order to have segmentation data stored therein. Data is then arranged such that a single segment of data is within the first chain. This may involve removal and addition of MBUFs to the chain. Once the first chain is reflective of a single segment, a second MBUF is allocated and pre-appended to the second chain in order to have segmentation data stored therein. When necessary, the method is continued for subsequent segments. Thus it is possible to allocate many MBUFs in order to support the data reorganization necessary for segmentation.

Figure 3A:
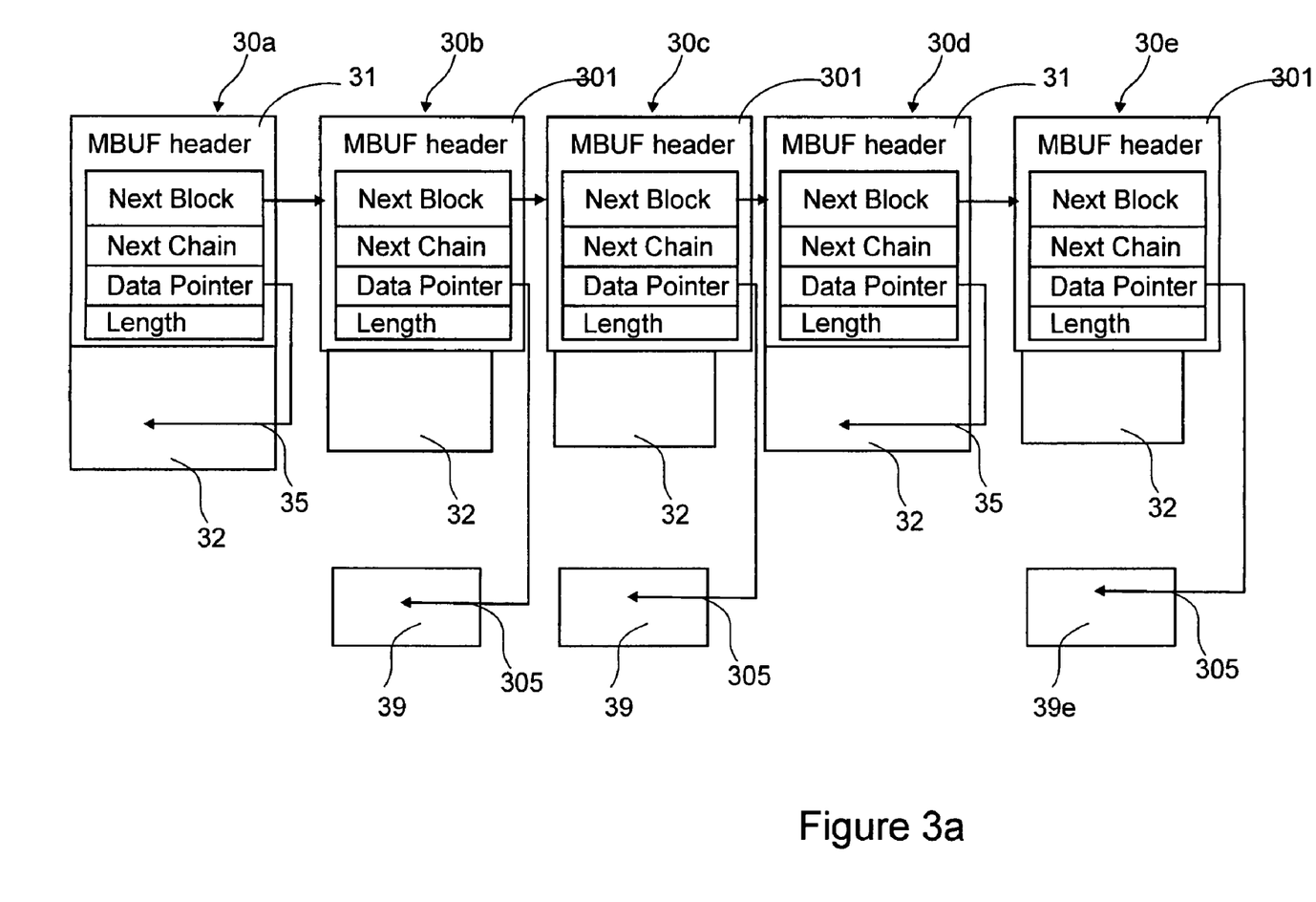
FIG. 3a illustrates a chain of MBUFs addressing data within a cluster, the data fragmented to account for a maximum packet transmit size.

Referring to FIG. 3a, a data packet is processed that is greater than 2 KB and intended for Ethernet transmission. With the data, the memory allocation process is provided with a data length value. Based on the type of data transmission, here Ethernet packet, and the data length value, the memory allocation process determines a memory allocation structure. The structure includes at least an MBUF 30a absent data stored within a data portion thereof 32 for providing storage space for data to be inserted therein during fragmentation of the data. The at least an MBUF 30a is followed by a plurality of MBUFs 30b and 30c, for example indexing data from the data packet within clusters 39. The amount of data stored within the clusters 39 is less than a maximum amount of data for a single Ethernet packet. Following the MBUFs 30b and 30c is at least an MBUF 30d absent data stored therein for providing storage space for data to be inserted therein during fragmentation of the data. Following this at least an MBUF 30d is another MBUF 30e, for example indexing cluster 39e of data from the data packet.

During fragmentation, data portions of the MBUFs 30a and 30d are filled with data relating to each fragment. The linked list of MBUFs is then severed—fragmenting the data—between MBUF 30c and 30d. When additional memory space is required, then a further memory allocation process is performed to allocate further memory resources. Through conservative estimation of the memory requirements of fragmentation, it is possible to obviate a need to re-allocate memory during fragmentation for most fragmentation operations. This saves on energy consumption since a single allocation of memory buffers is sufficient in most cases.

Once fragmented, the data is in two separate fragments to meet packet size restrictions for Ethernet traffic. Each packet includes a header MBUF 30a and 30d, respectively, and then one or more further MBUFs 30b and 30c and 30d, respectively, for storing of data or for addressing data within a cluster 39. In this fragmenting operation, MBUFs 30a, and 30d have data relating to the fragmenting inserted therein. Prior art implementations require that further MBUFs are allocated for this additional data. The fragmenting operation according to the above embodiment is typically efficient power usage and for memory utilization.

Figure 3B:
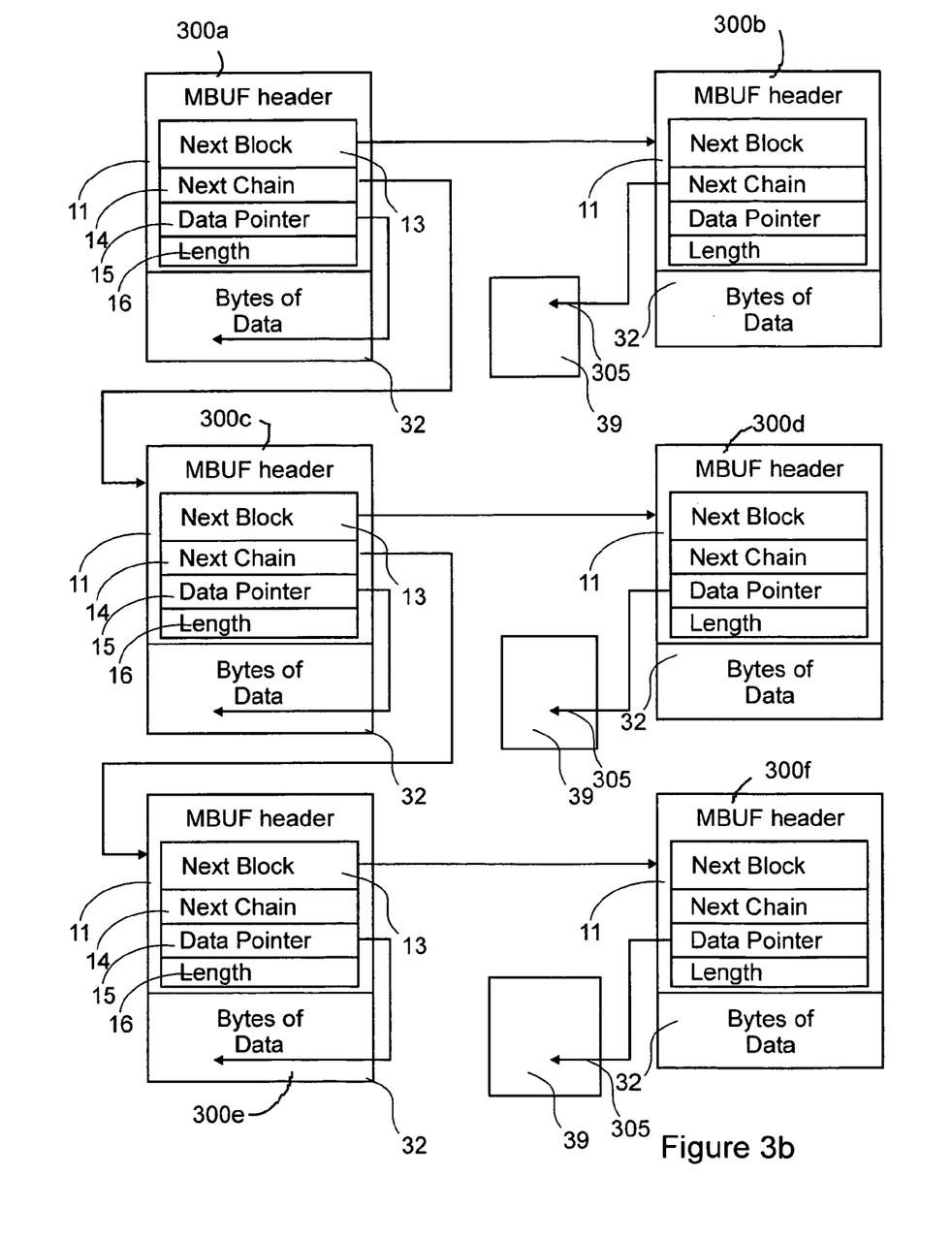
FIG. 3b illustrates the chain of MBUFs of FIG. 3a fragmented into separate packets each addressing data within a cluster, the data segmented to account for a maximum packet transmit size.

Referring to FIG. 3b, a data stream is processed that is greater than a maximum segment size for transmission and intended for transmission. With the data, the memory allocation process is provided with a data length value. Based on the type of data transmission, for example TCP, and the data length value, the memory allocation process determines a memory allocation structure. The structure includes at least an MBUF 300a absent data stored within a data portion thereof 32 for providing storage space for data to be inserted therein during segmentation of the data. The at least an MBUF 300a is followed by one or more MBUFs 300b, for example indexing data from the data packet within clusters 39. The amount of data stored within the clusters 39 is less than a maximum amount of data for a single transmission. Following the one or more MBUFs 300b are no further MBUFs. That said, in a subsequent chain MBUF 300c is present absent data stored therein for providing storage space for data to be inserted therein during segmentation of the data. Following this at least an MBUF 300c is another MBUF 300d, for example indexing cluster 39 of data from the data packet. Following the one or more MBUFs 300d are no further MBUFs. That said, in a subsequent chain MBUF 300e is present absent data stored therein for providing storage space for data to be inserted therein during segmentation of the data. Following this at least an MBUF 300e is another MBUF 300f, for example indexing cluster 39 of data from the data packet. Of course, 300a optionally includes a string of MBUFs supporting sufficient memory to be available during segmentation. Further optionally, MBUF 300b includes a linked list of MBUFs indexing data either therein or within cluster 39.

During segmentation, data portions of the MBUFs 300a, 300c, and 300e are filled with data relating to each segment. The two dimensional linked list of MBUFs is then severed—segmenting the data—between chains. When additional memory space is required, then a further memory allocation process is performed to allocate further memory resources. Through conservative estimation of the memory requirements of segmentation, it is possible to obviate a need to re-allocate memory during segmentation for most segmentation operations. This saves on energy consumption since a single allocation of memory buffers is sufficient in most cases.

Once segmented, the data is in two separate segments to meet segment size restrictions for TCP traffic. Each segment includes a header MBUF 300a, 300c, and 300e, respectively, and then one or more further MBUFs 300b, 300d, and 300f, respectively, for storing of data or for addressing data within a cluster 39. In this segmentation operation, MBUFs 300a, 300c, and 300e have data relating to the segmentation inserted therein. Prior art implementations require that further MBUFs are allocated for this additional data. The segmentation operation according to the above embodiment is typically efficient power usage and for memory utilization.

Figure 4A:
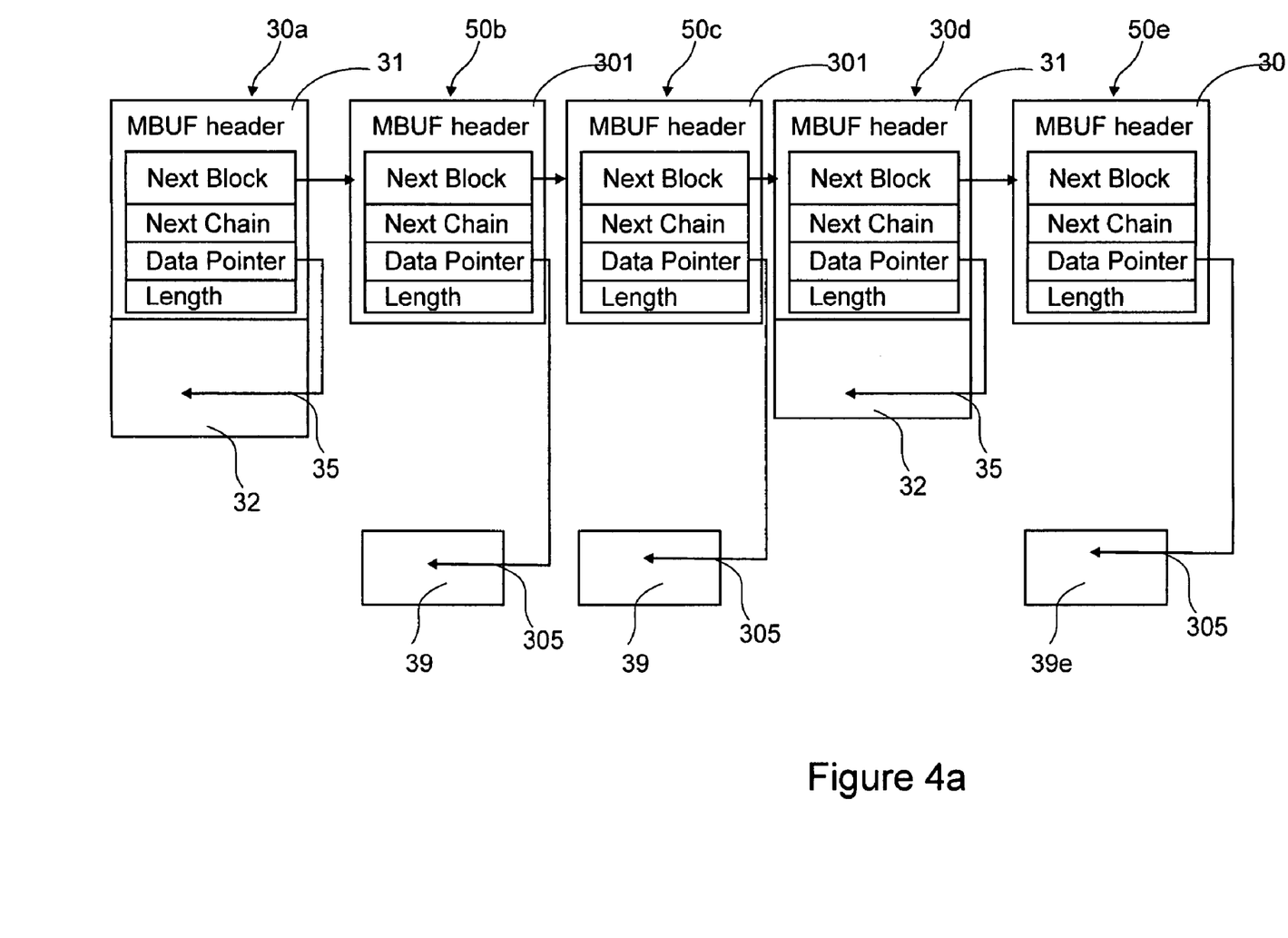
FIG. 4a illustrates a chain of MBUFs addressing data within clusters, the data pre-fragmented to account for a maximum packet transmit size according to the invention.

Referring to FIG. 4a, a memory diagram for a fragmentation operation is shown similar to that of FIG. 3a. Here, MBUFs absent a data portion thereof 50b, 50c, and 50d are used for addressing data within clusters 39. The memory allocated within the data portions of, for example, MBUF 50b is unused and, therefore, the diagram represents a more efficient memory utilisation for a same operation.

Figure 4B:
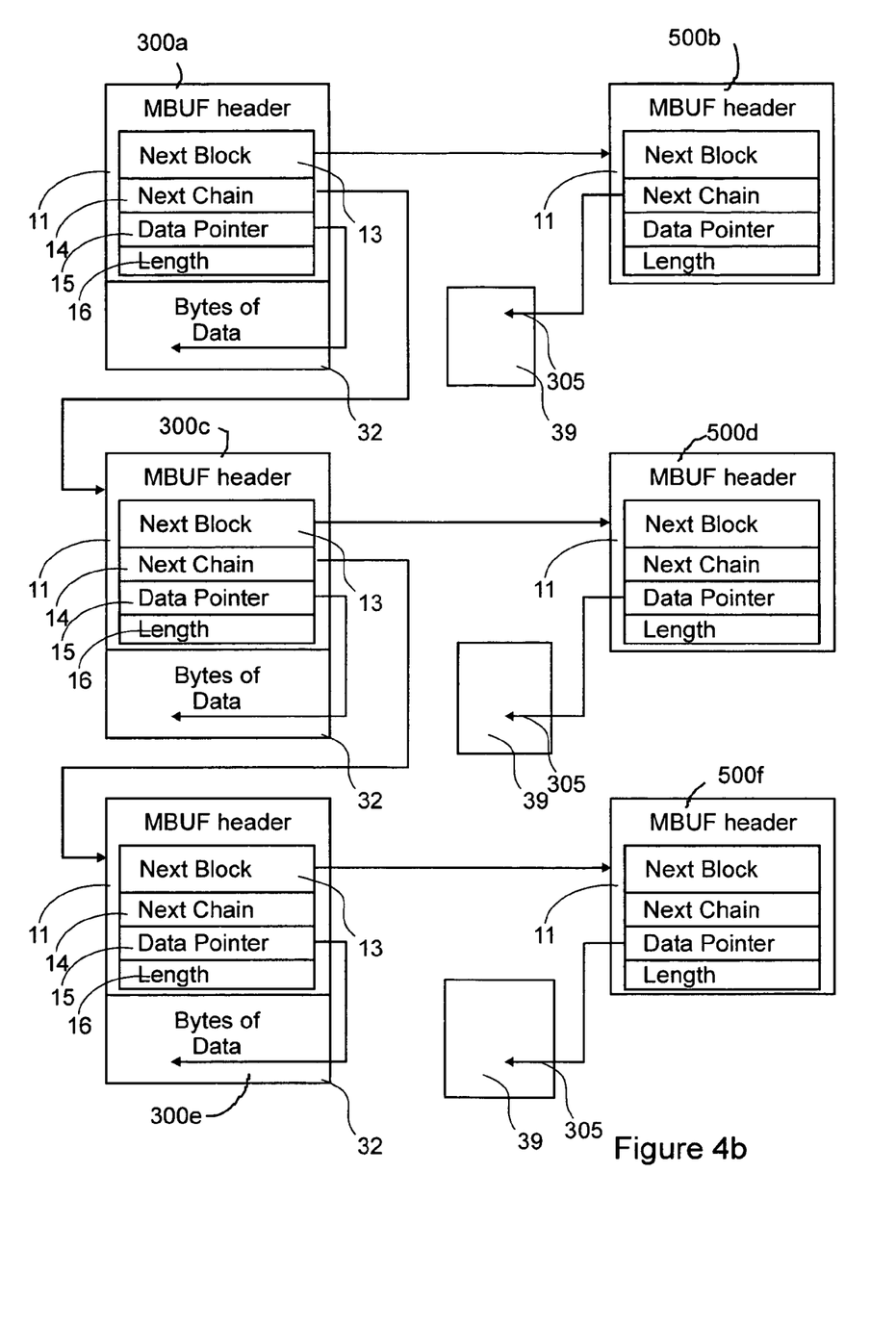
FIG. 4b illustrates a MBUFs addressing data within clusters, the data fragmented to account for a maximum packet transmit size according to the invention.

Referring to FIG. 4b, a memory diagram for a segmentation operation is shown similar to that of FIG. 3b. Here, MBUFs absent a data portion thereof 500b, 500d, and 500f are used for addressing data within clusters 39. The memory allocated within the data portions of, for example, MBUF 50b is unused and, therefore, the diagram represents a more efficient memory utilisation for a same operation.

Thus, segmentation and fragmentation operations according to the above embodiments are performed with little further processing of the data. What according to prior art methods required significant memory reallocation and processing, becomes a simple and efficient operation. For example, the format is compatible with existing protocols and BSD software since it does not allocate an unused resource. Modifying existing architectures in a fashion that is backwards compatible is often desirable.

Figure 5:
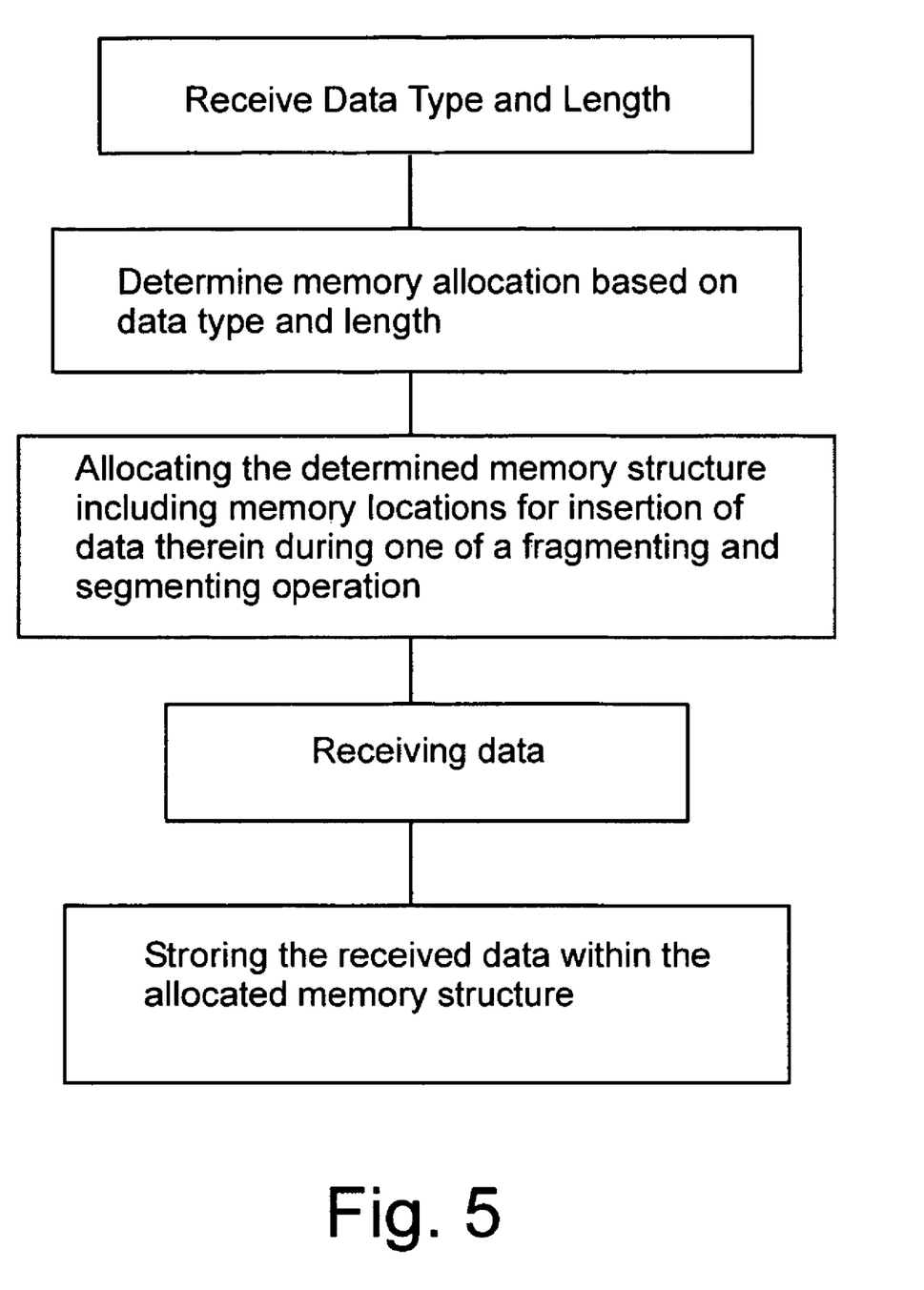
FIG. 5 illustrates a simplified flow diagram of a method according to the invention.

Referring to FIG. 5, a method of allocating memory within a linked list of MBUFs is shown. A data length is provided as is a type of data to be stored. Based on the data protocol type of the data and on the length, a memory allocation process is executed for determining a memory allocation structure including available memory storage locations for use during fragmentation or segmentation. The memory is then allocated. The allocated memory accounts for a likely amount of data that will need to be inserted during an expected segmentation or fragmentation operation. Data is provided for storage within the allocated memory and is stored therein according to the allocation of the memory, leaving memory storage space for data to be stored therein during fragmentation.

Numerous other embodiments may be envisaged without departing from the spirit or scope of the invention.

What is claimed is:

1. A method comprising:
providing a data protocol type and length of first data;
determining, in dependence upon the data protocol type and the length, a linked list memory buffer structure compatible with a BSD implementation and locations within the memory buffer structure for storage of data, the determined linked list memory buffer structure having at least one MBUF positioned at a location within the linked list memory buffer structure at which one of a segment or a fragment is determined to begin, the at least one MBUF having a data portion;
storing within MBUF headers of memory buffers of the linked list memory buffer structure second data for forming the determined linked list memory buffer structure prior to storing the first data within the linked list memory buffer structure;
storing the first data within the linked list memory buffer structure such that at least a portion of the data portion of the at least one MBUF is left absent of first data, the at least a portion for use in one of a fragmentation operation and a segmentation operation of the first data; and
performing one of a segmentation operation and a fragmentation operation, wherein the at least a portion of the data portion of the at least one MBUF is filled with data relating to a segment or a fragment which is formed in response to performing the respective segmentation operation or fragmentation operation.

2. A method according to claim 1 wherein the one of a segmentation operation and a fragmentation operation is a fragmentation operation.

3. A method according to claim 2 wherein the at least a portion of the at least one MBUF is positioned at a location within the linked list memory buffer structure for starting a fragment.

4. A method according to claim 3 wherein after storing the first data, the at least one MBUF includes a data portion absent first data stored therein.

5. A method according to claim 2 comprising:
receiving the first data; and wherein during storing the first data the at least one MBUF is positioned between data for each of two different fragments.

6. A method according to claim 2 wherein the fragmentation operation is performed absent further memory allocation.

7. A method according to claim 1 wherein the one of a segmentation operation and a fragmentation operation is a segmentation operation.

8. A method according to claim 7 wherein the segmentation operation is performed absent further memory allocation.

9. A method according to claim 7 wherein the at least one MBUF is positioned at a location within the linked list for starting a segment.

10. A method according to claim 9 wherein the at least one MBUF comprises a plurality of MBUFs and some of the plurality of MBUFs are absent a data portion thereof.

11. A method according to claim 7 comprising:
receiving the first data; and wherein during storing the first data the at least one MBUF is positioned between data for each of two different segments.

12. A method according to claim 11 wherein the at least one MBUF is a first MBUF within a chain of MBUFs.

13. A method according to claim 11 wherein the linked list memory buffer structure comprises a plurality of chains of MBUFs, the at least one MBUF comprising a first MBUF within each of the plurality of chains of MBUFs.

14. A method according to claim 13 wherein a data portion of the at least one MBUF is absent data stored therein prior to the segmentation operation.

15. A method according to claim 1 wherein the linked list memory buffer structure comprises a plurality of MBUFs, some of the plurality of MBUFs having a different format than others of the plurality of MBUFs.

16. A method according to claim 1 wherein storing of the first data is performed in accordance with the determination of the linked list memory buffer structure.

17. A method according to claim 1 wherein the method is for use in data processing supporting backwards compatibility with existing BSD packet processing methods.

18. A circuit comprising:
a buffer for receiving data, the data comprising first data for at least one of transmission and storage according to a known data protocol and second data comprising a length value that is indicative of the length of the first data; and,
one of a pre-segmentation and a pre-fragmentation circuit comprising memory allocation circuitry for:
determining, in dependence upon the data protocol type and the length, a linked list memory buffer structure compatible with a BSD implementation and locations within the memory buffer structure for storage of data, the determined linked list memory buffer structure having at least one MBUF positioned at a location within the linked list memory buffer structure at which one of a segment or a fragment is determined to begin, the at least one MBUF having a data portion;
storing within MBUF headers of memory buffers of the linked list memory buffer structure third data for forming the determined linked list memory buffer structure prior to storing the first data within the linked list memory buffer structure;

storing the first data within the linked list memory buffer structure such that at least a portion of a data portion of the at least one MBUF is left absent of first data, the at least a portion for use in one of a fragmentation operation and a segmentation operation of the first data; and performing one of a segmentation operation and a fragmentation operation, wherein the at least a portion of the data portion of the at least one MBUF is filled with data relating to a segment or a fragment which is formed in response to performing the respective segmentation operation or fragmentation operation.

19. A circuit according to claim 18 wherein the one of a pre-segmentation and a pre-fragmentation circuit comprises circuitry for performing the at least one of a segmentation operation and a fragmentation operation absent further memory allocation and absent inserting another MBUF within the linked list memory buffer structure.

20. A circuit according to claim 18 wherein the at least one MBUF is allocated but the received data is other than stored within a data portion of the at least one MBUF until one of the segmentation operation and the fragmentation operation is performed.

21. A circuit according to claim 19 wherein the circuitry for performing the at least one of a segmentation operation and a fragmentation operation comprises a segmentation circuit for storing within a first MBUF header data relating to a segment and for severing the linked list prior to the first MBUF of a subsequent segment.

22. A circuit according to claim 19 wherein the circuitry for performing the at least one of a segmentation operation and a fragmentation operation comprises a fragmentation circuit for storing within a first MBUF header data relating to a fragment and for severing the linked list prior to the first MBUF of a subsequent fragment.

23. A circuit according to claim 18 wherein the at least one of a pre-segmentation and pre-fragmentation circuit comprises an MBUF allocation circuit for allocating MBUFs of different sizes in dependence of at least the linked list memory buffer structure, and wherein the at least one MBUF is absent a data portion.

24. A circuit according to claim 23 wherein the linked list memory buffer structure is backward compatible with an existing BSD implementation.

* * * * *